US012609864B2

(12) United States Patent
Minakawa

(10) Patent No.: US 12,609,864 B2
(45) Date of Patent: Apr. 21, 2026

(54) COMMUNICATION APPARATUS, CONTROL METHOD, AND STORAGE MEDIUM

(71) Applicant: CANON KABUSHIKI KAISHA, Tokyo (JP)

(72) Inventor: Atsushi Minakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 18/482,446

(22) Filed: Oct. 6, 2023

(65) Prior Publication Data

US 2024/0121153 A1 Apr. 11, 2024

(30) Foreign Application Priority Data

Oct. 6, 2022 (JP) ................................. 2022-161718

(51) Int. Cl.
*H04L 41/08* (2022.01)
*H04L 9/40* (2022.01)

(52) U.S. Cl.
CPC ........ *H04L 41/0886* (2013.01); *H04L 63/083* (2013.01)

(58) Field of Classification Search
CPC ........................... H04L 41/0886; H04L 63/083
USPC ......................................................... 709/224
See application file for complete search history.

(56) References Cited

U.S. PATENT DOCUMENTS

2015/0334759 A1* 11/2015 Hiramatsu ............ H04W 48/16
370/338
2015/0373763 A1* 12/2015 Ren ........................ H04W 76/14
370/338

2016/0110151 A1* 4/2016 Isonishi ........... H04N 21/43637
345/2.2
2017/0013461 A1* 1/2017 Yamaki ............... H04W 12/041
2017/0295448 A1 10/2017 Mccann et al.
2022/0353135 A1* 11/2022 Bang ................... H04L 41/0836
2023/0262454 A1* 8/2023 Kamath ............... H04W 8/005
726/7

FOREIGN PATENT DOCUMENTS

WO WO-2020085019 A1 * 4/2020 ............ H04W 88/08

* cited by examiner

*Primary Examiner* — Suraj M Joshi
*Assistant Examiner* — Ayele F Woldemariam
(74) *Attorney, Agent, or Firm* — Canon U.S.A., Inc., IP Division

(57) ABSTRACT

A communication apparatus includes a first processing unit that performs sharing processing for sharing a communication parameter for connecting to a wireless network with another communication apparatus, according to a first method compliant with a Wi-Fi Easy Connect® standard, a second processing unit that performs sharing processing for sharing a communication parameter for connecting to a wireless network with the other communication apparatus, according to a second method compliant with another different from the Wi-Fi Easy Connect® standard, a waiting unit that waits to receive an authentication request compliant with the Wi-Fi Easy Connect® standard and that waits to receive a signal compliant with the other standard, upon receiving a predetermined operation, and a control unit that performs control so that the first processing unit performs sharing processing if the authentication request is received and the second processing unit performs sharing processing if the signal is received.

11 Claims, 7 Drawing Sheets

FIG.3

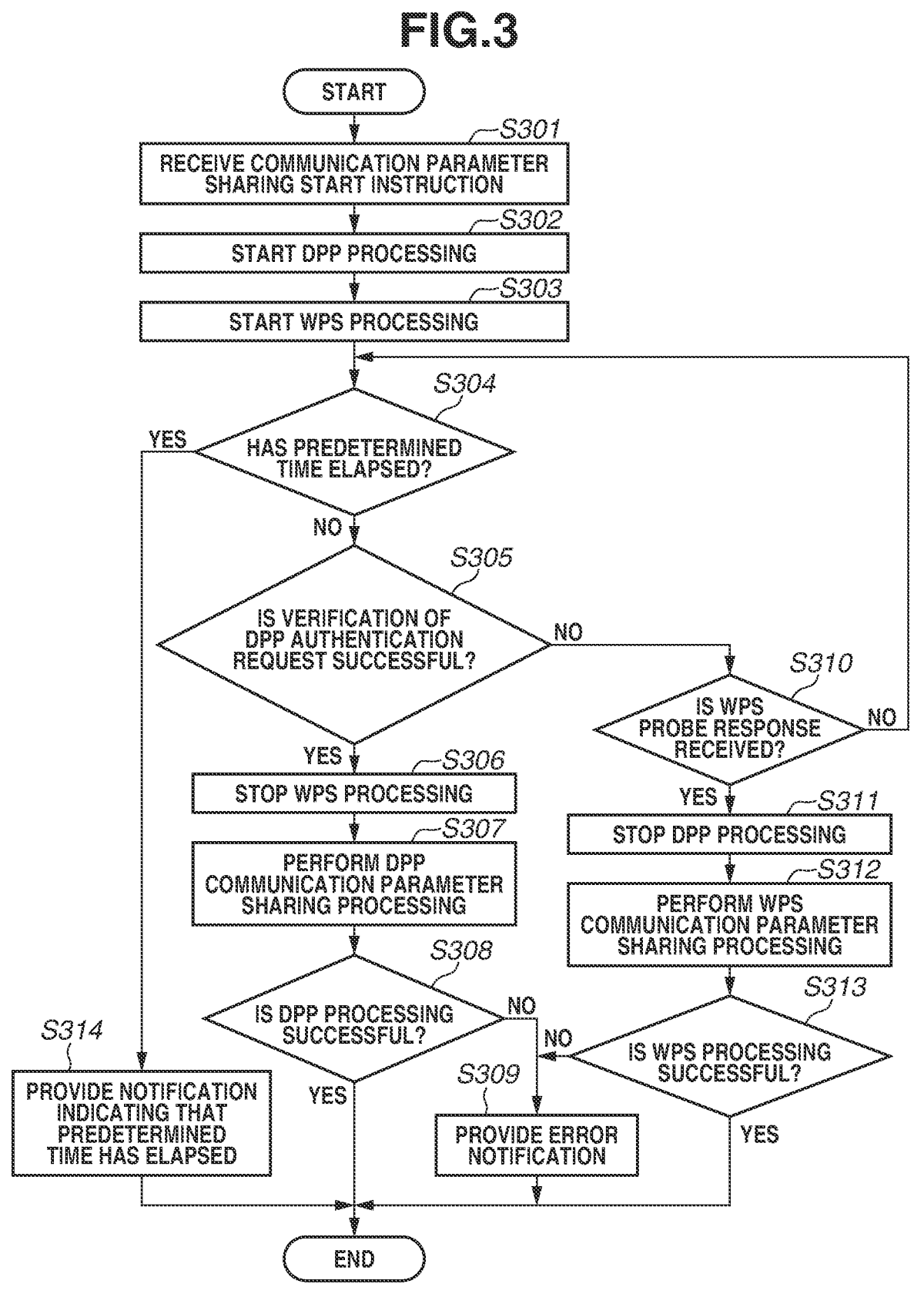

START

S301
RECEIVE COMMUNICATION PARAMETER
SHARING START INSTRUCTION

S302
START DPP PROCESSING

S303
START WPS PROCESSING

S304
HAS PREDETERMINED
TIME ELAPSED?

YES

NO

S305
IS VERIFICATION OF
DPP AUTHENTICATION
REQUEST SUCCESSFUL?

NO

S310
IS WPS
PROBE RESPONSE
RECEIVED?

NO

YES

S306
STOP WPS PROCESSING

YES

S311
STOP DPP PROCESSING

S307
PERFORM DPP
COMMUNICATION PARAMETER
SHARING PROCESSING

S312
PERFORM WPS
COMMUNICATION PARAMETER
SHARING PROCESSING

S308
IS DPP PROCESSING
SUCCESSFUL?

NO

S313
IS WPS PROCESSING
SUCCESSFUL?

NO

S314
PROVIDE NOTIFICATION
INDICATING THAT
PREDETERMINED
TIME HAS ELAPSED

YES

S309
PROVIDE ERROR
NOTIFICATION

YES

END

FIG.4

COMMUNICATION APPARATUS, CONTROL METHOD, AND STORAGE MEDIUM

BACKGROUND

Field

The present disclosure relates to communication parameter setting processing.

Description of the Related Art

The Wi-Fi Easy Connect® standard has recently been developed as a technique for setting a communication parameter for accessing a wireless network. The Wi-Fi Easy Connect® standard specifies that an apparatus called a configurator provides a communication parameter to an apparatus called an enrollee, as discussed in United States Patent Application Publication No. 2017/0295448. As another communication parameter sharing technique different from the Wi-Fi Easy Connect® standard, for example, the Wi-Fi Protected Setup® standard is known. The Wi-Fi Protected Setup® standard specifies that an apparatus called a registrar provides a communication parameter to an apparatus called an enrollee.

If communication parameter sharing processing is performed using an apparatus compliant with a plurality of standards as described above, it can take a substantial amount of time and labor for a user to, for example, select which of the standards to use to perform the communication parameter sharing processing.

SUMMARY

Various embodiments of the present disclosure are directed to enhancing user's convenience in a case where an apparatus compliant with a plurality of types of communication parameter sharing processing performs communication parameter sharing processing.

According to one embodiment of the present disclosure, a communication apparatus includes one or more memories storing instructions, and one or more processors coupled to the one or more memories, wherein execution of the instructions causes the one or more processors to function as a first processing unit configured to perform first sharing processing for sharing a communication parameter for connecting to a wireless network with another communication apparatus, according to a first method compliant with a Wi-Fi Easy Connect® standard, a second processing unit configured to perform second sharing processing for sharing a communication parameter for connecting to a wireless network with the other communication apparatus, according to a second method compliant with another standard different from the Wi-Fi Easy Connect® standard, a waiting unit configured to wait to receive an authentication request compliant with the Wi-Fi Easy Connect® standard and to wait to receive a signal compliant with the other standard, upon receiving a predetermined operation, and a control unit configured to perform control so that the first processing unit performs the first sharing processing in a case where the authentication request compliant with the Wi-Fi Easy Connect® standard is received and the second processing unit performs the second sharing processing in a case where the signal compliant with the other standard is received.

Further features of the present disclosure will become apparent from the following description of exemplary embodiments with reference to the attached drawings.

BRIEF DESCRIPTION OF THE DRAWINGS

FIG. 3 is a flowchart illustrating processing to be performed by the communication apparatus according to one embodiment.

FIG. 4 is a diagram illustrating an example of a user interface according to one embodiment.

DESCRIPTION OF THE EMBODIMENTS

Figure 1:
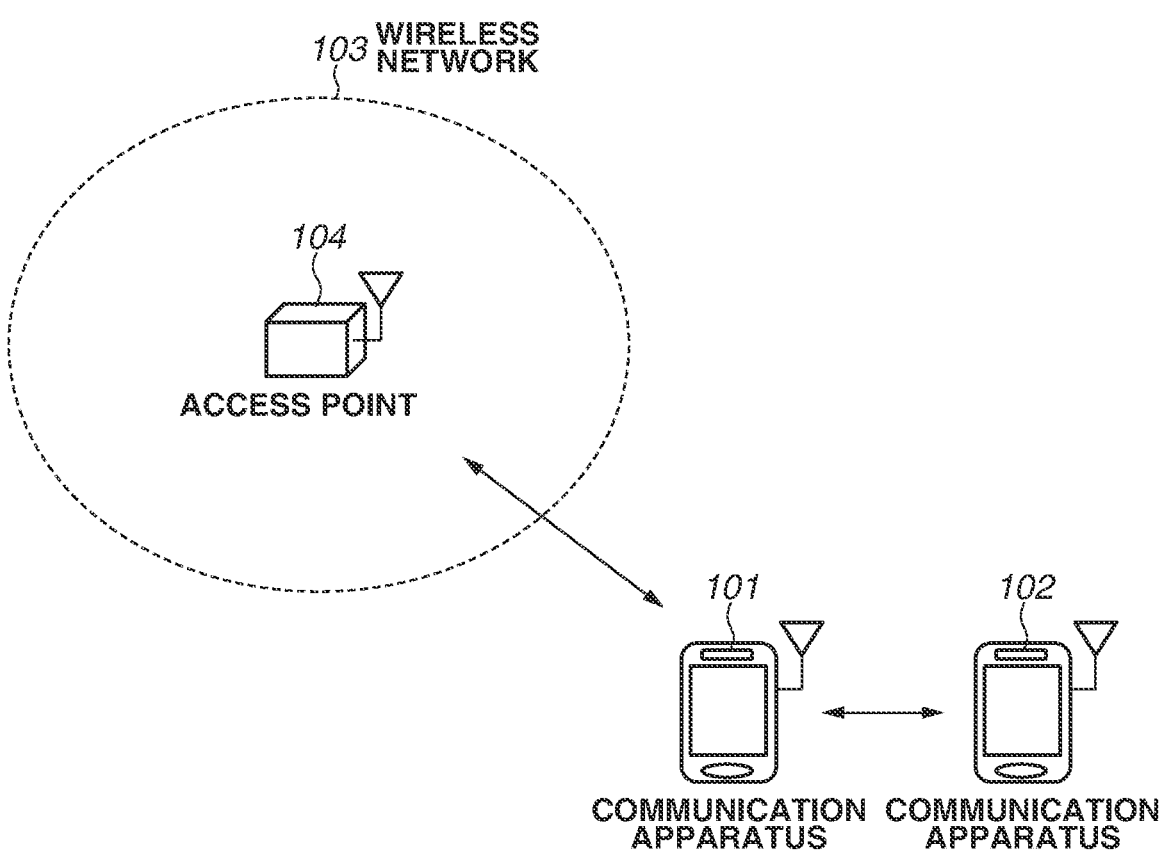
FIG. 1 is a diagram illustrating an entire configuration of a communication system.

Exemplary embodiments of the present disclosure will be described in detail below with reference to the attached drawings. The following exemplary embodiments are not intended to limit the claimed invention. A plurality of features is described in the exemplary embodiments, but not all of the features are essential to each embodiment of the present disclosure and the features can be combined as appropriate. Further, in the attached drawings, the same reference numerals are given to the same or similar components, and redundant descriptions thereof will be omitted.

A communication system including a communication apparatus 101 according to a first exemplary embodiment of the present disclosure will be described below by way of example. The communication apparatus 101 operates in compliance with the Wi-Fi Easy Connect® standard. Wi-Fi Easy Connect® is synonymous with Device Provisioning Protocol (DPP), and will hereinafter be referred to as "DPP". The communication apparatus 101 operates in compliance not only with the DPP standard, but also with the Wi-Fi Protected Setup® standard. The DPP standard and the Wi-Fi Protected Setup® standard will be described below by way of example, but the invention is not limited to use of these standards; in other embodiments, other standards or protocols may be used.

<System Configuration and Apparatus Configuration>

FIG. 1 illustrates an entire configuration of the communication system. The communication system includes the communication apparatus 101 and a communication apparatus 102 that is an external communication apparatus.

The communication apparatus 101 operates as a slave station (STA) to be connected to a wireless network 103 formed by an access point 104. The communication apparatus 101 also operates as an enrollee compliant with the DPP standard and as an enrollee compliant with the Wi-Fi Protected Setup® standard. The term "enrollee" refers to an apparatus that functions to obtain or receive a communication parameter for connecting to the wireless network 103 in order to perform data communication (described below). Assume herein that the communication apparatus 101 receives, from the communication apparatus 102 or the access point 104, a communication parameter for connecting to the wireless network 103. The communication parameter is, for example, a credential compliant with the DPP standard or the Wi-Fi Protected Setup® standard, and includes information about a key, such as netAccessKey, as key information for connecting to the wireless network 103. However, the information is not limited thereto. The communication parameter may include information about a key, such as a pre-shared key (PSK), as key information. The communication parameter may also include information about Service Set Identifier (SSID) that is an identifier for the wireless network 103, frequency channel information, information about an encryption method and an authentication method used in the wireless network 103, and an expiration date for the communication parameter.

In a case where the communication apparatus 101 serving as the enrollee compliant with the DPP standard requests a communication parameter in DPP processing (described below), the communication apparatus 101 also provides role information. The role information indicates the role of the communication apparatus 101 after communication parameter setting processing (also referred to as communication parameter sharing processing) is performed. This role indicates an "access point" that forms a wireless network using the obtained communication parameter, or a "station" that connects to the wireless network using the obtained communication parameter. Alternatively, the role information may indicate a "configurator" that provides the communication parameter. In the present exemplary embodiment, the communication apparatus 101 operates as a station, and thus the role information indicating the "station" is provided.

The communication apparatus 102 operates as the configurator compliant with the DPP standard.

The configurator is an apparatus that functions to provide or transmit a communication parameter for connecting to or forming a network. The communication apparatus 102 provides the communication apparatus 101 with a communication parameter for connecting to the wireless network 103. The communication apparatus 102 can also provide the access point 104 with the communication parameter for forming the wireless network 103. The communication apparatus 102 can also function as an access point, and can provide a communication parameter for connecting to a network provided by the communication apparatus 102.

Processing for sharing a communication parameter that is performed by the configurator or enrollee compliant with the DPP standard will hereinafter be referred to as DPP processing. Processing for sharing a communication parameter that is performed by the registrar or enrollee compliant with the Wi-Fi Protected Setup® standard will hereinafter be referred to as WPS processing. Specific examples of the communication apparatus 101 and the communication apparatus 102 include an access point, a mobile phone, a digital camera, a video camera, a printer, a projector, a personal computer (PC), a personal digital assistant (PDA), a smartphone, and a smartwatch. However, the communication apparatus 101 and the communication apparatus 102 are not limited thereto.

The wireless network 103 is compliant with the Institute of Electrical and Electronics Engineers (IEEE) 802.11 series standards, and is a network to which the communication apparatus 101 is to be connected. The wireless network 103 is formed by, for example, the access point 104, but instead may be formed by an apparatus different from the communication apparatus 101 and serving as a group owner compliant with the Wi-Fi Direct® standard.

The access point 104 operates as, for example, an access point (AP) that supports the DPP, and constructs the wireless network 103 based on the communication parameter provided by the communication apparatus 102. The access point 104 may be an access point that does not support the DPP.

The access point 104 also operates as a registrar compliant with the Wi-Fi Protected Setup® standard. Like the configurator, the registrar is an apparatus that functions to provide a communication parameter for connecting to the wireless network 103.

Figure 2:
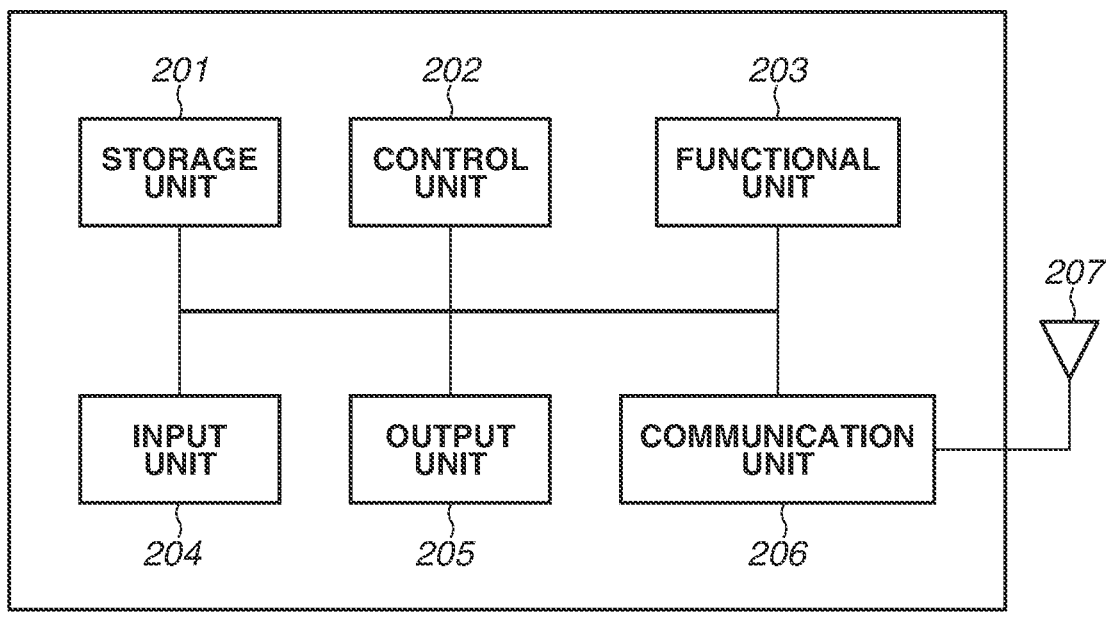
FIG. 2 is a block diagram illustrating a functional configuration of a communication apparatus according to one embodiment.

FIG. 2 is a block diagram illustrating a functional configuration of the communication apparatus 101. While FIG. 2 illustrates a hardware configuration of the communication apparatus 101, the communication apparatus 102 has a configuration similar to that of the communication apparatus 101.

A storage unit 201 includes one or more memories, such as a read-only memory (ROM) or a random access memory (RAM), and stores programs for performing various operations (described below), and various kinds of information such as a communication parameter for wireless communication. Not only memories such as a ROM and a RAM, but also storage media such as a flexible disk, a hard disk, an optical disk, a magneto-optical disk, a compact disc (CD)-ROM, a CD-recordable (R), a magnetic tape, a nonvolatile memory card, and a digital versatile disk (DVD) may be used as the storage unit 201.

A control unit 202 includes one or more processors such as a central processing unit (CPU) or a micro processing unit (MPU), and executes the programs stored in the storage unit 201 to control an entire operation of the communication apparatus 101. The control unit 202 may control the entire operation of the communication apparatus 101 using the programs stored in the storage unit 201 and an operating system (OS) in cooperation. The control unit 202 may include a plurality of processors, such as multicore processors, and the plurality of processors may control the entire operation of the communication apparatus 101.

The control unit 202 controls a functional unit 203 to perform predetermined processing such as image capturing, printing, or projection.

The functional unit 203 performs the predetermined processing in the communication apparatus 101. For example, if the communication apparatus 101 is a camera, the functional unit 203 serves as an image capturing unit and performs image capturing processing. The communication apparatus 101 performs the DPP processing or the WPS processing to thereby connect to the wireless network 103, and transmits image data generated in the image capturing processing to an external apparatus via the wireless network 103. For example, if the communication apparatus 101 is a printer, the functional unit 203 serves as a printing unit and performs printing processing. The communication apparatus 101 performs the DPP processing or the WPS processing to thereby connect to the wireless network 103, and performs printing processing on image data received from an external apparatus via the wireless network 103. If the communication apparatus 101 is a scanner, the functional unit 203 serves as a scanning unit and performs processing of scanning a document. The communication apparatus 101 performs the DPP processing or the WPS processing to thereby connect to the wireless network 103, and transmits image data generated by scanning the document to an external apparatus via the wireless network 103. For example, if the communication apparatus 101 is a projector, the functional unit 203 serves as a projection unit and performs projection processing. The data to be processed by the functional unit 203 may be data stored in the storage unit 201, or may be data communicated with another communication apparatus via a communication unit 206 (described below). The communication apparatus 101 may include one or more functions described above, or may include functions other than the functions described above.

An input unit 204 receives various operations from a user. The input unit 204 includes, for example, a touch panel, a keyboard, or hardware keys.

An output unit 205 performs various types of output processing for the user. The output processing performed by the output unit 205 includes at least one of display on a screen, audio output from a speaker, and output of vibrations. The input unit 204 and the output unit 205 may be implemented as a single module like a touch panel.

The communication unit 206 controls wireless communication compliant with the IEEE 802.11 series standards and also controls Internet Protocol (IP) communication. The communication unit 206 controls an antenna 207 to transmit and receive radio signals for wireless communication. The communication unit 206 performs the above-described DPP processing or WPS processing. The communication apparatus 101 communicates content, such as image data, document data, or video data, with the communication apparatus 102 via the communication unit 206. The communication apparatus 101 can also control communication via Bluetooth®, near-field communication (NFC), or the like.

<Operation of Apparatus>

FIG. 3 is a flowchart illustrating processing to be performed by the communication apparatus 101. The flowchart illustrates processing to be performed when the communication apparatus 101 performs the communication parameter sharing processing. The flowchart illustrates a procedure for processing to be implemented by the control unit 202 reading out a program stored in the storage unit 201 and executing the program at power-on of the communication apparatus 101. Instead of implementing the processing at power-on of the communication apparatus 101, the processing may be implemented when the communication apparatus 101 enters a predetermined operation mode, such as a communication setting mode, in response to a user operation, or when a predetermined application, such as a communication setting application, is activated.

At least a part of the processing in the flowchart illustrated in FIG. 3 may be implemented by hardware. In this case, for example, using a predetermined compiler, a dedicated circuit may be automatically generated on a field-programmable gate array (FPGA) from a program for implementing each step. Alternatively, the processing may be implemented as hardware by forming a gate array circuit, like the FPGA. Further alternatively, the processing may be implemented by an application-specific integrated circuit (ASIC). In this case, each block in the flowchart can be regarded as a hardware block. A plurality of blocks may be integrated into one hardware block, or each block may be configured as a plurality of hardware blocks.

Figure 4:
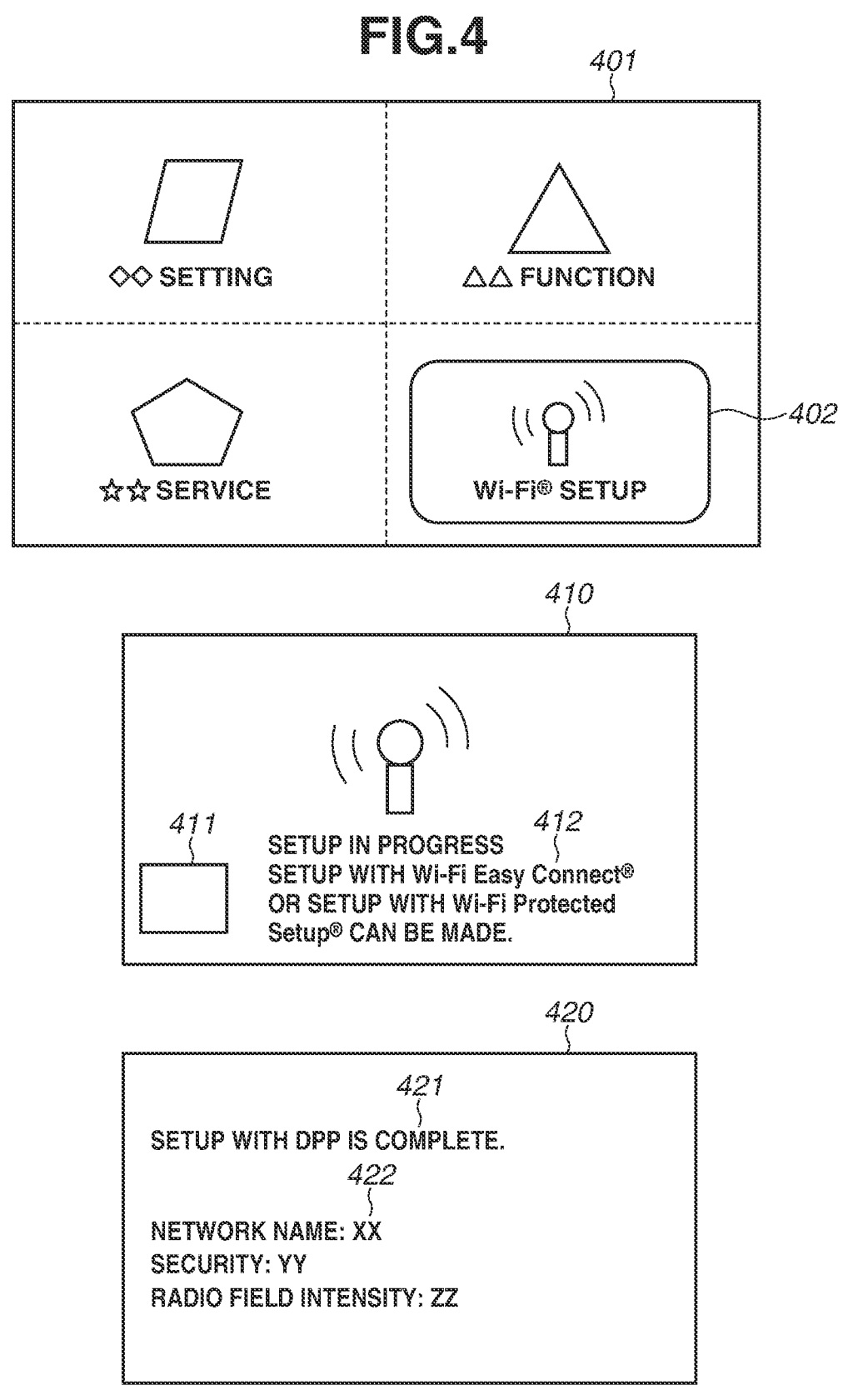

In step S301, the communication apparatus 101 waits for a communication parameter sharing start instruction from the user. At this time, the communication apparatus 101 receives the communication parameter sharing start instruction from the user via the input unit 204. In other words, the input unit 204 receives the instruction. For example, the input unit 204 receives the instruction in response to a user's selection operation on a hardware button included in the communication apparatus 101, or a user's selection operation on a button as a user interface (UI) component displayed on the output unit 205. For example, assume that a UI illustrated in FIG. 4 is used. In this case, the instruction is received in response to selection (pressing) of a communication parameter sharing start button 402 by the user on a menu screen 401. The communication apparatus 101 may also receive the communication parameter sharing start instruction from an external apparatus (e.g., a remote controller that performs infrared communication) (not illustrated).

In step S302, upon receiving the communication parameter sharing start instruction, the communication apparatus 101 starts enrollee processing compliant with the DPP standard. More specifically, the communication apparatus 101 waits for an authentication request that is issued to start authentication processing and is compliant with the DPP standard. The term "authentication request" refers to a DPP Authentication Request frame compliant with the DPP standard. In this step, the communication apparatus 101 is assumed to wait for the authentication request at a predetermined communication channel, but instead may wait for the authentication request at a plurality of communication channels, or at all available communication channels. A notification about the predetermined communication channel is provided to an external apparatus together with, for example, a public key (described below).

The authentication request includes authentication information for use in the authentication processing, information about the communication apparatus 102, a random number generated by the communication apparatus 102, and a public key (a public key for the communication apparatus 102) for use in generating a shared key. The shared key is used to encrypt the random number for authentication. The term "authentication information" used herein refers to a hash value for a public key (e.g., a bootstrapping key defined in the DPP standard) for authentication of the communication apparatus 101 that is obtained in advance by the communication apparatus 102. More specifically, the information about the communication apparatus 102 is a hash value for a public key for authentication of the communication apparatus 102. The random number is used for authentication when an authentication response (described below) is received.

As a method for sharing a public key for authentication, assume that, for example, the communication apparatus 101 displays, on the output unit 205, a Quick Response Code (a QR Code®) including the public key for authentication and the communication apparatus 102 captures an image of the QR Code® to share the public key for authentication in advance. The QR Code® may include not only the public key, but also a media access control (MAC) address of the communication apparatus 101, information about the channel to be used, and the like (bootstrapping information in the DPP standard). However, the method for sharing the public key is not limited to the configuration where the communication apparatus 101 displays the QR Code® on a display. For example, the public key may be shared via communication using Bluetooth®, NFC, a wireless local area network (WLAN), or the like. Regarding the timing for sharing the public key for authentication, it is assumed that the public key is shared with the communication apparatus 102 during a period of receiving the communication parameter sharing start instruction after power-on of the communication apparatus 101. Alternatively, for example, the communication apparatus 102 may store the public key shared in processing before power-on of the communication apparatus 101 in a nonvolatile memory or the like, and may use the public key.

In step S303, the communication apparatus 101 starts enrollee processing compliant with the Wi-Fi Protected Setup® standard. Assume herein that the communication apparatus 101 starts processing using a push button configuration (PBC) method compliant with the Wi-Fi Protected Setup® standard. More specifically, the communication apparatus 101 starts transmitting a probe request frame. At this time, the communication apparatus 101 transmits the probe request frame and waits to receive a probe response frame over a plurality of channels. Upon receiving the probe response frame including an information element indicating that Wi-Fi Protected Setup® is enabled, the communication apparatus 101 transmits an association request to which the information element indicating Wi-Fi Protected Setup® is added and performs network connection processing.

At this time, the communication apparatus 101 controls waiting for the authentication request in the DPP processing and waiting for the probe response frame in the WPS processing in parallel. More specifically, the communication apparatus 101 performs control so as to be ready to receive the authentication request in the DPP processing while maintaining a state ready to receive the probe response frame after transmitting the probe request frame in the WPS processing. Examples of the configuration in which waiting for the authentication request in the DPP processing and waiting for the probe response frame are performed in parallel may include a configuration in which waiting for the authentication request in the DPP processing and waiting for the probe response frame are simultaneously performed, and a configuration in which waiting for the authentication request in the DPP processing and waiting for the probe response frame are automatically switched at predetermined time intervals. In this step, a screen such as a standby screen 410 illustrated in FIG. 4 may be displayed on the output unit 205 of the communication apparatus 101. A QR Code® 411 including the public key used in the DPP processing may be displayed on the standby screen 410, or a message 412 indicating that setup with the DPP, i.e., Wi-Fi Easy Connect® or setup with Wi-Fi Protected Setup® can be made may be displayed.

In step S304, the communication apparatus 101 determines whether a predetermined time has elapsed from the reception of the communication parameter sharing start instruction. The predetermined time is, for example, 120 seconds, which is specified in the Wi-Fi Protected Setup® standard.

If the communication apparatus 101 determines that the predetermined time has not elapsed (NO in step S304), the processing proceeds to step S305. In step S305, the communication apparatus 101 receives a DPP authentication request and determines whether verification of the received authentication request is successful. More specifically, upon receiving the authentication request from the configurator (e.g., the communication apparatus 102) compliant with the DPP standard, the communication apparatus 101 performs the verification using the authentication information included in the authentication request and determines whether the verification is successful. More specifically, the communication apparatus 101 calculates the hash value for the public key for the authentication of the communication apparatus 101, and compares the calculated hash value with the hash value (the authentication information) included in the authentication request. If the hash values match, the communication apparatus 101 determines that the verification is successful. A hash function used to calculate the hash value at this time is defined in the DPP standard, and is the same as the hash function used by the configurator to calculate the hash value. If the communication apparatus 101 determines that the verification is successful (YES in step S305), the processing proceeds to step S306. If the communication apparatus 101 determines that the verification is not successful (NO in step S305), the processing proceeds to step S310.

In step S306, the communication apparatus 101 stops the WPS processing. For example, the communication apparatus 101 stops the transmission of the probe request frame. However, the present exemplary embodiment is not limited thereto. Alternatively, step S306 may be skipped, or the WPS processing may be continued until a predetermined time has elapsed from the reception of the communication parameter sharing start instruction in step S301. Further alternatively, the WPS processing may be continued until a stop instruction is received from the user. While the WPS processing is continued, if the probe response frame is received from the registrar (e.g., the access point 104), the communication apparatus 101 performs steps S312 and S313 (described below). In this case, steps S312 and S313 are performed in parallel with the DPP processing or after completion of the DPP processing.

In step S307, the communication apparatus 101 that has stopped the WPS processing in step S306 performs the communication parameter sharing processing compliant with the DPP standard. The communication parameter sharing processing compliant with the DPP standard will be described in detail below with reference to FIG. 5.

In step S308, the communication apparatus 101 determines whether the DPP processing is successful. More specifically, the communication apparatus 101 performs the communication parameter sharing processing compliant with the DPP standard to determine whether a communication parameter has successfully been obtained from the communication apparatus 102 serving as the configurator. If the communication apparatus 101 determines that the DPP processing is successful (YES in step S308), the communication parameter sharing processing is ended. The communication apparatus 101 can connect to the wireless network 103 using the obtained communication parameter. In step S308, whether the communication parameter has successfully been obtained may be determined, or whether the connection to the wireless network 103 using the obtained communication parameter has been established may be determined.

If the communication apparatus 101 determines that the DPP processing is not successful (NO in step S308), the processing proceeds to step S309. In step S309, the communication apparatus 101 provides an error notification. More specifically, the communication apparatus 101 displays, on the output unit 205, an error message indicating that the communication parameter sharing processing is unsuccessful, or an error message indicating that the authentication processing is unsuccessful, thereby notifying the user of the error. In addition to or in place of this error notification, the communication apparatus 101 may provide an error notification to the communication apparatus 102. The error notification to be displayed or provided may include an error code indicating the cause of the error. After that, the communication apparatus 101 ends the processing illustrated in FIG. 3. Instead of ending the processing illustrated in FIG. 3, the processing may return to step S301 to wait for another communication parameter sharing start instruction.

Referring again to step S305, if the communication apparatus 101 determines that the verification of the authentication request is not successful (NO in step S305), the processing proceeds to step S310. In step S310, the communication apparatus 101 determines whether the probe response frame indicating that Wi-Fi Protected Setup® is enabled is received. More specifically, the communication apparatus 101 determines whether the probe response frame to which the information element indicating that Wi-Fi Protected Setup® is enabled is added is received from the registrar (e.g., the access point 104).

If the communication apparatus 101 determines that the probe response frame is received (YES in step S310), the processing proceeds to step S311. In step S311, the communication apparatus 101 stops the DPP processing. However, the present exemplary embodiment is not limited thereto. Alternatively, step S311 may be skipped, or the DPP processing may be continued until a predetermined time has elapsed from the reception of the communication parameter sharing start instruction in step S301. Further alternatively, the DPP processing may be continued until a stop instruction is received from the user. While the DPP processing is continued, if the authentication request compliant with the DPP standard is received from the configurator (e.g., the communication apparatus 102), the communication apparatus 101 performs steps S307 and S308. In this case, steps S307 and S308 are performed in parallel with the WPS processing or after completion of the WPS processing.

In step S312, the communication apparatus 101 performs the communication parameter sharing processing compliant with the Wi-Fi Protected Setup® standard. In step S313, the communication apparatus 101 determines whether the communication parameter sharing processing is successful. In step S313, whether a communication parameter has successfully been shared may be determined, or whether the connection to the wireless network 103 using the communication parameter has been established may be determined. The communication parameter sharing processing compliant with the Wi-Fi Protected Setup® standard will be described in detail below with reference to FIG. 6. If the communication apparatus 101 determines that the WPS processing is successful (YES in step S313), the communication parameter sharing processing is ended. The communication apparatus 101 can connect to the wireless network 103 using the obtained communication parameter.

If the communication apparatus 101 determines that the WPS processing is not successful due to a communication error or the like (NO in step S313), the processing proceeds to step S309. In step S309, the communication apparatus 101 provides an error notification. The processing of step S309 is similar to the processing to be performed if the communication parameter is unable to be obtained in the communication parameter sharing processing compliant with the DPP standard (NO in step S308), and thus the description thereof will be omitted.

If the processing is determined to be successful in step S308 or S313, a screen such as a connection complete screen 420 illustrated in FIG. 4 may be displayed on the output unit 205 of the communication apparatus 101. A message 421 indicating which of the standards is used to complete the connection processing and information 422 about the connected network (e.g., the name of the wireless network 103 and security information) are displayed on the connection complete screen 420. In the case of obtaining communication parameters based on both of the DPP standard and the Wi-Fi Protected Setup® standard, a screen for selecting one of the communication parameters for connecting to the wireless network 103 may be displayed for the user. In the case of obtaining the communication parameters based on both of the DPP standard and the Wi-Fi Protected Setup® standard, the connection to the wireless network 103 may be established using the communication parameter shared according to one of the standards based on predetermined priorities.

Referring again to step S310, if the communication apparatus 101 determines that the probe response frame is not received (NO in step S310), the processing returns to step S304. In step S304, the communication apparatus 101 determines again whether the predetermined time has elapsed. If the communication apparatus 101 determines that the predetermined time has elapsed (YES in step S304), the processing proceeds to step S314. In step S314, the communication apparatus 101 provides a notification that the predetermined time has elapsed. More specifically, the communication apparatus 101 displays, on the output unit 205, an error message indicating that the predetermined time has elapsed from the start of the communication parameter sharing processing, or an error message indicating that the communication parameter sharing processing is unsuccessful, thereby notifying the user of the error. After that, the communication apparatus 101 ends the processing illustrated in FIG. 3. Instead of ending the processing illustrated in FIG. 3, the processing may return to step S301 to wait for another communication parameter sharing start instruction.

The above-described processing illustrated in FIG. 3 enables the user to perform the communication parameter sharing processing without selecting a standard or protocol for performing the communication parameter sharing processing in the communication apparatus 101 serving as the enrollee. In this case, the communication apparatus 101 waits for a request for the communication parameter sharing processing compliant with the DPP standard, and a request for the communication parameter sharing processing compliant with the Wi-Fi Protected Setup® standard, and can perform the communication parameter sharing processing for which the request is received.

The processing in the flowchart described above is an example where the connection to the wireless network 103 formed by the access point 104 is established in each of the DPP processing and the WPS processing. However, the present exemplary embodiment is not limited thereto. The network to be connected in the DPP processing may be different from the network to be connected in the WPS processing.

In the processing in the flowchart described above, the communication apparatus 101 is configured to wait for the authentication request for starting the authentication processing compliant with the DPP standard in step S302. However, the present exemplar embodiment is not limited thereto. The communication apparatus 101 may be configured to transmit the authentication request for starting the authentication processing compliant with the DPP standard to the communication apparatus 102. In this case, the communication apparatus 101 may operate as the configurator. In step S303, the communication apparatus 101 is configured to transmit the probe request frame. However, the present exemplary embodiment is not limited thereto. In step S303, the communication apparatus 101 may be configured to wait for the probe request frame.

Figure 5:
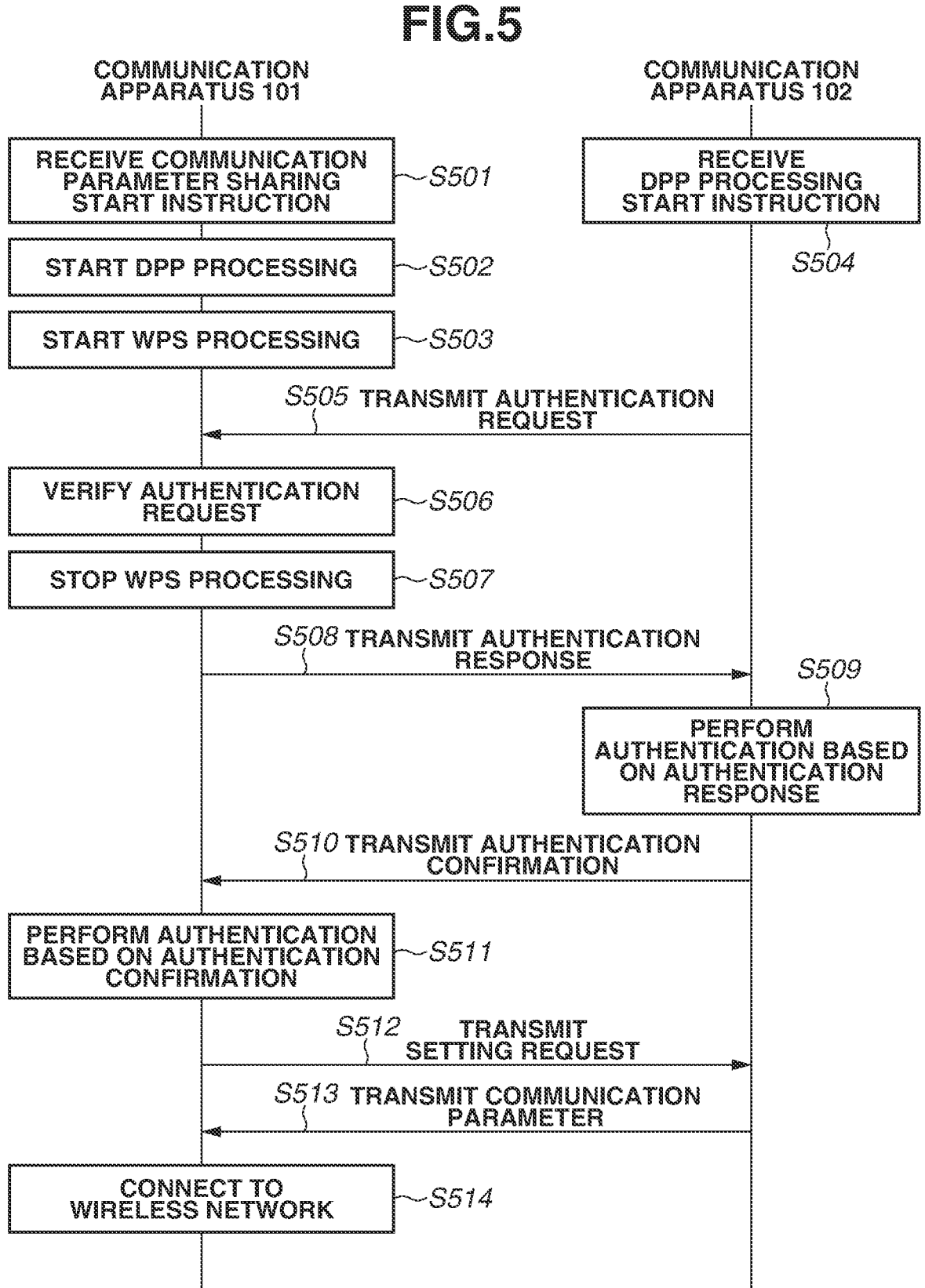
FIG. 5 is a sequence diagram between the communication apparatus and another communication apparatus according to one embodiment.

FIG. 5 is a sequence diagram illustrating exchange of information between the communication apparatus 101 (the enrollee) and the communication apparatus 102 (the configurator).

In step S501, the communication apparatus 101 receives a communication parameter sharing start instruction from the user. In step S502, the communication apparatus 101 starts the enrollee processing compliant with the DPP standard. More specifically, the communication apparatus 101 waits for an authentication request. In step S503, the communication apparatus 101 starts the enrollee processing compliant with the Wi-Fi Protected Setup® standard. More specifically, the communication apparatus 101 starts transmitting a probe request frame.

In step S504, upon receiving a DPP processing start instruction from the user, the communication apparatus 102 starts configurator processing compliant with the DPP standard. More specifically, the communication apparatus 102 generates an authentication request including the hash value for the preliminarily obtained public key for the authentication of the communication apparatus 101, and starts transmitting the authentication request.

In step S505, the communication apparatus 101 receives the authentication request transmitted from the communication apparatus 102. In step S506, the communication apparatus 101 performs verification processing on the communication apparatus 102 that has transmitted the authentication request. If the verification processing is successful, the communication apparatus 101 generates a shared key by using both a public key for generating the shared key for the communication apparatus 102 and a secret key for generating the shared key for the communication apparatus 101. The shared key is generated based on, for example, an Elliptic Curve Diffie-Hellman (ECDH) method. The method for generating the shared key is not limited to the ECDH method, and may be any other public key encryption method.

In step S507, the communication apparatus 101 stops the WPS processing. In step S508, the communication apparatus 101 transmits an authentication response. The term "authentication response" used herein refers to a DPP Authentication Response frame compliant with the DPP standard. The authentication response includes a public key for generating the shared key for the communication apparatus 101, a random number generated by the communication apparatus 101, and tag information.

The tag information is obtained by encrypting, with the above-described shared key, the hash value using the random number or the like included in the authentication request transmitted from the communication apparatus 102. The tag information is used for the authentication processing in the communication apparatus 102.

The public key for generating the shared key for the communication apparatus 101 is the public key for the communication apparatus 101 corresponding to the secret key for generating the shared key for the communication apparatus 101 that is used when the communication apparatus 101 generates the shared key. The public key for generating the shared key for the communication apparatus 102 is the public key corresponding to the secret key for generating the shared key for the communication apparatus 102 that is used when the communication apparatus 102 generates the shared key. The use of combinations of keys as described above enables the communication apparatus 101 to generate the same shared key as the shared key generated by the communication apparatus 102. If the respective public keys for shared key generation are unable to be exchanged properly between the communication apparatus 101 and the communication apparatus 102 by transmitting and receiving the above-described authentication request and authentication response, the same shared key is unable to be generated.

If the communication apparatus 102 stores public key information or the like, the communication apparatus 101 may be configured to transmit the authentication response to the communication apparatus 102 without waiting to receive the authentication request.

In step S508, the communication apparatus 102 receives the authentication response from the communication apparatus 101. In step S509, the communication apparatus 102 performs authentication based on the authentication response. Meanwhile, the communication apparatus 101 that has transmitted the authentication response waits for an authentication confirmation transmitted from the communication apparatus 102. The term "authentication confirmation" used herein refers to a DPP Authentication Confirm frame compliant with the DPP standard, and includes tag information. The tag information is obtained in such a manner that the communication apparatus 102 encrypts the random number included in the authentication response transmitted from the communication apparatus 101, with the shared key. In step S510, the communication apparatus 102 that has authenticated the communication apparatus 101 based on information included in the authentication response in step S509 transmits the authentication confirmation to the communication apparatus 101.

In step S511, if the communication apparatus 101 that has received the authentication confirmation has properly decoded the tag information included in the authentication confirmation, with the shared key generated by the communication apparatus 101, the communication apparatus 101 determines that the authentication processing is successful. If the communication apparatus 101 determines that the authentication processing is successful, the communication apparatus 101 recognizes the communication apparatus 102 that has transmitted the authentication request, as the configurator. If the communication apparatus 101 determines that the authentication processing is not successful (i.e., if the authentication processing has failed), the communication apparatus 101 does not recognize the communication apparatus 102 as the configurator and provides an error notification, and then ends the communication parameter sharing processing.

In step S512, the communication apparatus 101 that has performed the authentication processing in step S511 transmits a setting request to the communication apparatus 102 serving as the configurator. The term "setting request" used herein refers to a DPP Configuration Request frame compliant with the DPP standard. The setting request includes device information and role information about the communication apparatus 101. The device information is, for example, a device name of the communication apparatus 101. The role information is information indicating the role of the communication apparatus 101 after the reception of the communication parameter, and indicates one of "access point", "station", and "configurator". In this case, the role information indicates the "station" that is an apparatus that connects to the wireless network 103.

In step S513, the communication apparatus 101 receives a setting response including a communication parameter from the communication apparatus 102 serving as the configurator. The term "setting response" used herein refers to a DPP Configuration Response frame compliant with the DPP standard.

The setting response transmitted from the communication apparatus 102 includes the communication parameter, the expiration date for the communication parameter, the public key exclusively used for the communication apparatus 102 serving as the configurator, and the role information. In step S514, the communication apparatus 101 connects to the wireless network 103 using the obtained communication parameter. The network to be connected at this time may be a network provided by an external access point, or may be a network provided by the communication apparatus 102 operating as an access point.

The processing described above with reference to FIG. 5 enables the communication apparatus 101 to perform the communication parameter sharing processing compliant with the DPP standard to obtain the communication parameter from the communication apparatus 102.

Figure 6:
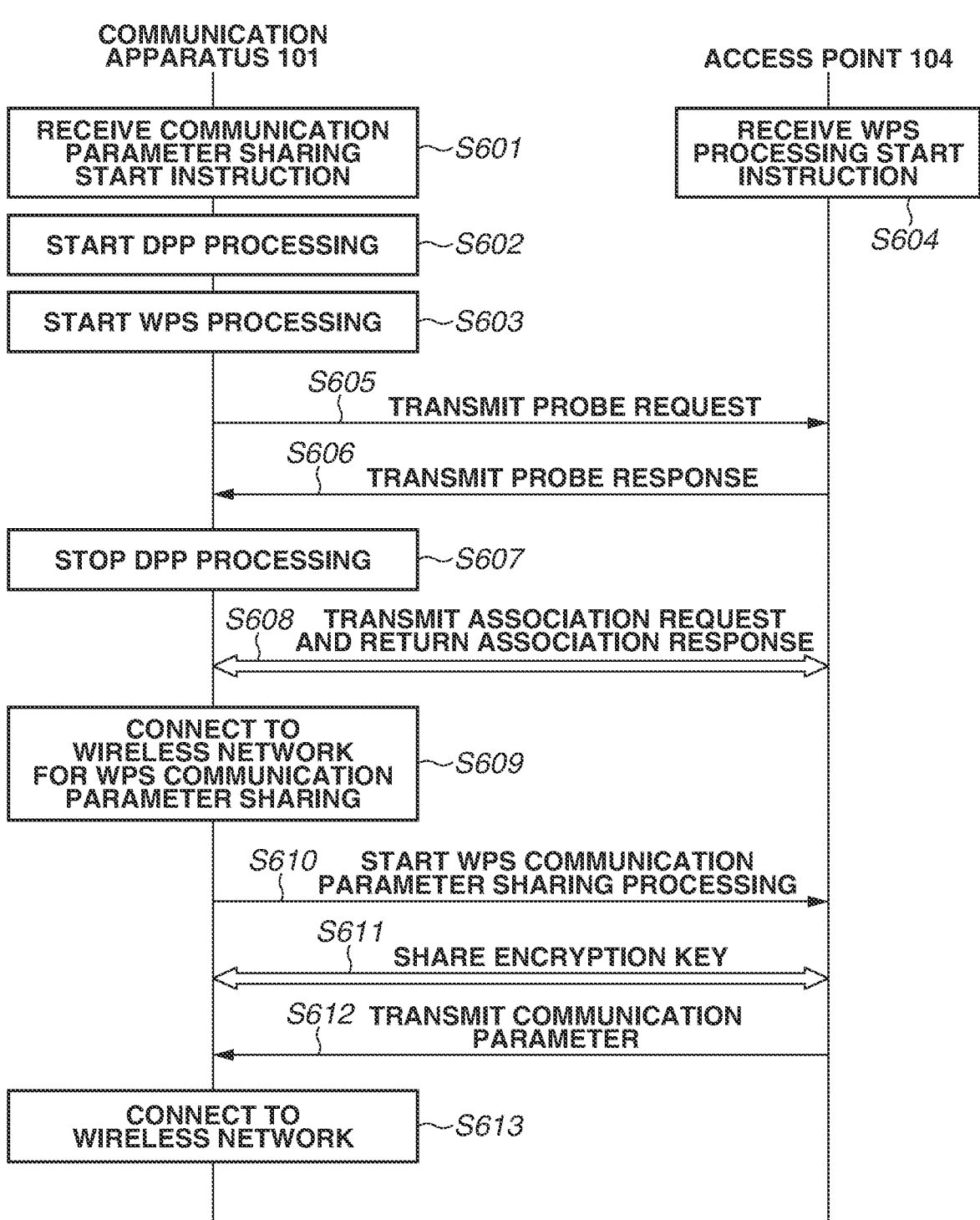
FIG. 6 is a sequence diagram between the communication apparatus and an access point according to one embodiment.

FIG. 6 is a sequence diagram illustrating exchange of information between the communication apparatus 101 (the enrollee) and the access point 104 (the registrar). The processing from the reception of a communication parameter sharing start instruction from the user to the start of transmission of a probe request frame (steps S601 to S603) is similar to the processing illustrated in FIG. 5 (steps S501 to S503), and thus the descriptions thereof will be omitted. In step S604, upon receiving a WPS processing start instruction from the user, the access point 104 starts registrar processing compliant with the Wi-Fi Protected Setup® standard.

In step S605, the access point 104 that has become ready to receive the probe request frame in step S604 receives the probe request frame from the communication apparatus 101. In step S606, the access point 104 transmits, to the communication apparatus 101, a probe response frame to which the information element indicating that Wi-Fi Protected Setup® is enabled is added.

In step S607, upon receiving the probe response frame from the access point 104, the communication apparatus 101 stops the DPP processing, so that the connection to the wireless network 103 constructed by the access point 104 is performed. More specifically, the communication apparatus 101 transmits, to the access point 104, an association request to which the information element indicating Wi-Fi Protected Setup® is added.

In step S608, upon receiving the association request from the communication apparatus 101, the access point 104 transmits, to the communication apparatus 101, an association response to which the information element indicating Wi-Fi Protected Setup® is added.

In step S609, the communication apparatus 101 completes the connection to the wireless network 103. In a case where the connection is established using a signal to which the information element indicating Wi-Fi Protected Setup® is added, the communication apparatus 101 and the access point 104 can communicate only a signal for sharing a communication parameter. In other words, the communication apparatus 101 and the access point 104 are unable to communicate user data or the like.

In step S610, the communication apparatus 101 starts the communication parameter sharing processing compliant with the Wi-Fi Protected Setup® standard. More specifically, the communication apparatus 101 transmits an Extensible Authentication Protocol over LAN (EAPoL)-Start frame to start a parameter sharing session of Wi-Fi Protected Setup®.

In step S611, the access point 104 uses an EAP frame to perform processing for sharing a communication parameter with the communication apparatus 101 according to the Wi-Fi Protected Setup® standard. More specifically, using the EAP frame, the access point 104 shares an encryption key with the communication apparatus 101 by using Diffie-Hellman (DH) key exchange. In step S612, the access point 104 transmits a communication parameter encrypted with the encryption key shared with the communication apparatus 101. The communication apparatus 101 decodes the communication parameter with the encryption key shared with the access point 104. In step S613, the communication apparatus 101 connects to the wireless network 103 using the decoded communication parameter. In this case, the communication apparatus 101 and the access point 104 can communicate user data or the like. The above-described processing enables the communication apparatus 101 to obtain the communication parameter from the access point 104 using a method compliant with the Wi-Fi Protected Setup® standard.

The processing described above with reference to FIG. 6 enables the communication apparatus 101 to perform the communication parameter sharing processing compliant with the Wi-Fi Protected Setup® standard to obtain the communication parameter from the access point 104. The function of the access point 104 may be included in the communication apparatus 102. In other words, the communication apparatus 102 can also function as an access point and be configured to directly communicate and connect with the communication apparatus 101 without involving an external access point. In this case, the communication apparatus 102 can perform the DPP processing as illustrated in FIG. 5, and can also perform the WPS processing as illustrated in FIG. 6. Which one of the DPP processing and the WPS processing is to be performed by the communication apparatus 102 may be selected by the user, or may be selected based on predetermined priorities.

As described above, according to the present exemplary embodiment, in a case where an apparatus compliant with a plurality of communication parameter sharing standards including the DPP standard performs communication parameter sharing processing, a simple UI can be used, and thus the user's convenience can be enhanced.

More specifically, for example, the standard for the communication parameter sharing processing to be performed can be automatically selected from among the plurality of communication parameter sharing standards simply by, for example, a user's operation of pressing a button on the apparatus, which leads to enhancement of the user's convenience.

In a second exemplary embodiment, the communication apparatus 101 having a configuration in which a personal identification number (PIN) mode compliant with the Wi-Fi Protected Setup® standard is taken into consideration will be described. More specifically, the communication apparatus 101 performs the communication parameter sharing processing compliant with the DPP standard in consideration of the communication parameter sharing method compliant with the Wi-Fi Protected Setup® standard using the PIN method instead of the PBC method. The entire system configuration and the apparatus configuration are similar to those according to the first exemplary embodiment, and thus the descriptions thereof will be omitted. A setting for switching between the PBC method and the PIN method can be made by the user from, for example, a setting menu for Wi-Fi Protected Setup® in the communication apparatus 101.

<Operation of Apparatus>

Figure 7:
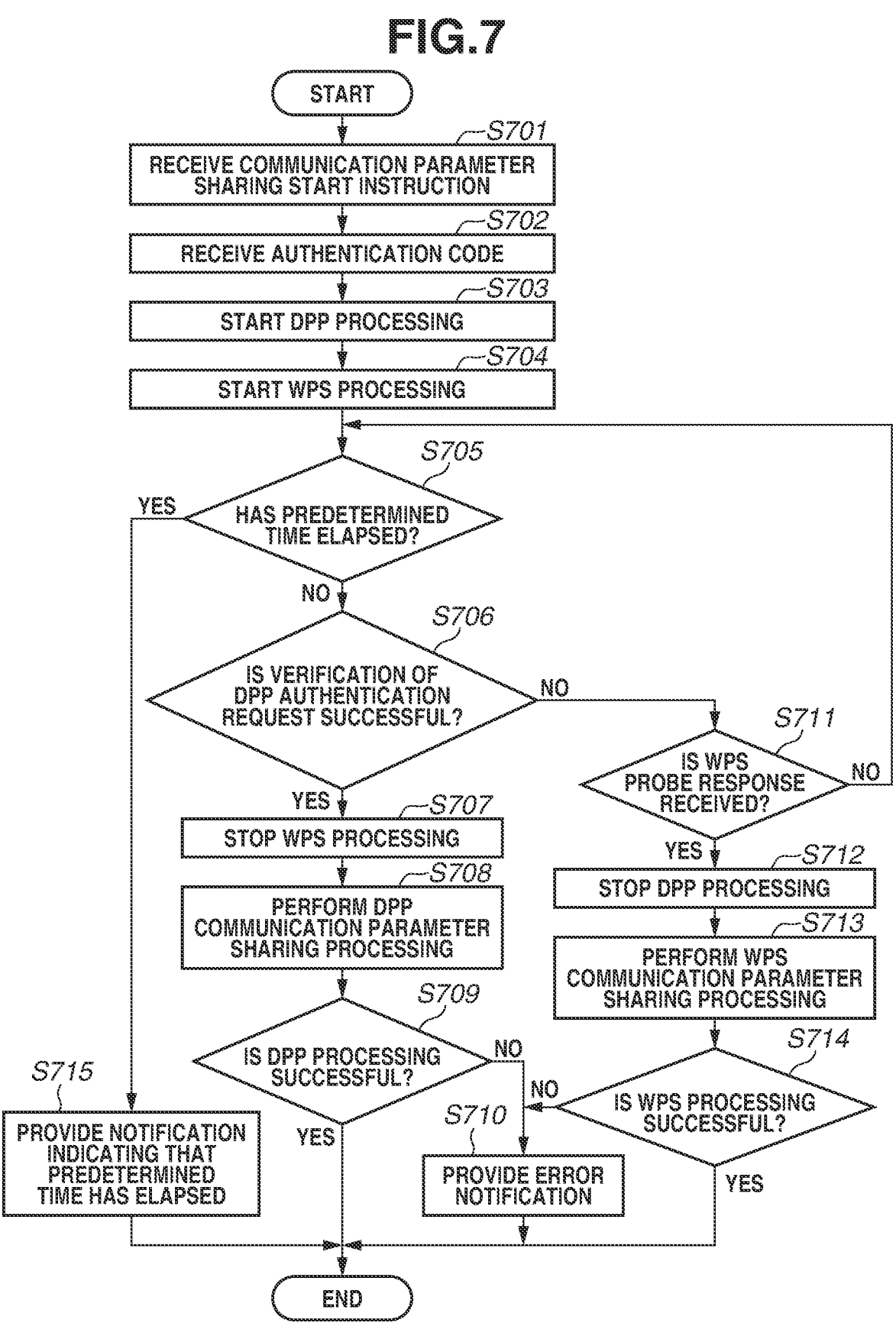
FIG. 7 is a flowchart illustrating another processing to be performed by the communication apparatus according to one embodiment.

FIG. 7 is a flowchart illustrating processing to be performed by the communication apparatus 101 (the enrollee) according to the present exemplary embodiment.

In step S701, the communication apparatus 101 waits for a communication parameter sharing start instruction from the user. In step S702, upon receiving the communication parameter sharing start instruction, the communication apparatus 101 prompts the user to input an authentication code and receives the input authentication code. In step S703, the communication apparatus 101 that has received the input authentication code starts the enrollee processing compliant with the DPP standard. In step S704, the communication apparatus 101 performs the WPS processing by using the authentication code input in step S702 as a PIN in the PIN mode compliant with the Wi-Fi Protected Setup® standard.

In step S705, the communication apparatus 101 that has started the WPS processing in step S704 determines whether a predetermined time has elapsed. The processing from the determination of whether the predetermined time has elapsed to the completion of the communication parameter sharing processing (steps S705 to S715) is similar to the processing illustrated in FIG. 3 (steps S304 to S314), and thus the descriptions thereof will be omitted.

As described above, according to the present exemplary embodiment, the communication apparatus 101 serving as the enrollee performs the communication parameter sharing processing compliant with the DPP standard in consideration of the communication parameter sharing method compliant with the Wi-Fi Protected Setup® standard using the PIN method. Thus, the present exemplary embodiment can also be applied to a case where the communication parameter sharing method compliant with the Wi-Fi Protected Setup® standard is carried out using the PIN method instead of the PBC method.

While an example where the PIN method is used in the WPS processing has been described above, the PIN method may also be used in the DPP processing. A case where a PIN is used for exchange of bootstrapping information using a Public Key Exchange (PKEX) protocol in the DPP processing will now be described. In the case of using the PKEX protocol, an initiator and a responder in the DPP processing use the same code to share the bootstrapping information, i.e., a public key or the like. The code may include characters, numbers, symbols, or a combination thereof. In the present exemplary embodiment, a PIN is used as the code. More specifically, the authentication code received in step S702 is used as a PKEX protocol code in the DPP processing. In this case, the same PIN may be used in the WPS processing and the DPP processing, or different PINs may be used in the DPP processing and the WPS processing.

Modified Examples

In the above-described exemplary embodiments, the WPS processing is started together with the DPP processing in response to a predetermined operation performed by the user. Instead of or in addition to this method, another communication parameter sharing standard, such as Wi-Fi Direct® or AirStation One-Touch Secure System (AOSS), may be started. For example, when the user selects a setting button for network connection, a plurality of types of processing among the DPP processing, the WPS processing, Wi-Fi Direct®, and AOSS is started. In this case, which of the communication parameter sharing standards to start can be set in advance by the user.

In the above-described exemplary embodiments, the configuration for sharing the authentication information between the communication apparatuses 101 and 102 using the image of the QR Code® has been described. Instead of capturing the image of the QR Code®, wireless communication via NFC, Bluetooth®, or the like may be used. Wireless communication based on IEEE 802.11ad, TransferJet®, or the like may also be used.

The QR Code® to be scanned is not limited to the QR Code® displayed on the display, and may be a QR Code® attached in the form of a sticker to a housing of the communication apparatus 101. The QR Code® to be scanned may be attached to an instruction manual or a package such as a cardboard box containing the communication apparatus 101 for sale. Instead of QR Code®, a barcode or a two-dimensional code may be used. Instead of machine-readable information such as QR Code®, information in a form readable by the user may be used.

The above-described exemplary embodiments can also be implemented by the following processing. A program for implementing one or more functions according to the exemplary embodiments described above is supplied to a system or apparatus via a network or storage medium, and one or more processors in a computer of the system or apparatus read out and execute the program. The above-described exemplary embodiments can also be implemented by a circuit (e.g., an ASIC) for implementing the one or more functions.

The present disclosure is not limited to the above-described exemplary embodiments. Various alterations and modifications can be made without departing from the spirit and scope of the invention.

The disclosure of the exemplary embodiments includes the following configurations, method, and storage medium, among others.

<Configuration 1>

A communication apparatus includes a first processing unit configured to perform first sharing processing for sharing a communication parameter for connecting to a wireless network with another communication apparatus, according to a first method compliant with a Wi-Fi Easy Connect® standard, a second processing unit configured to perform second sharing processing for sharing a communication parameter for connecting to a wireless network with the other communication apparatus, according to a second method compliant with another standard different from the Wi-Fi Easy Connect® standard, a waiting unit configured to wait to receive an authentication request compliant with the Wi-Fi Easy Connect® standard and to wait to receive a signal compliant with the other standard, upon receiving a predetermined operation, and a control unit configured to perform control so that the first processing unit performs the first sharing processing in a case where the authentication request compliant with the Wi-Fi Easy Connect® standard is received and the second processing unit performs the second sharing processing in a case where the signal compliant with the other standard is received.

<Configuration 2>

The communication apparatus according to configuration 1, wherein the other standard is a Wi-Fi Protected Setup® standard.

<Configuration 3>

The communication apparatus according to configuration 2, wherein the other standard is a push button configuration (PBC) method compliant with the Wi-Fi Protected Setup® standard.

<Configuration 4>

The communication apparatus according to configuration 2, wherein the other standard is a personal identification number (PIN) method compliant with the Wi-Fi Protected Setup® standard.

<Configuration 5>

The communication apparatus according to configuration 1, wherein the other standard is an AirStation One-Touch Secure System (AOSS) standard.

<Configuration 6>

The communication apparatus according to configuration 1, wherein the waiting unit performs, in parallel, waiting to receive the authentication request and waiting to receive the signal.

<Configuration 7>

The communication apparatus according to configuration 1, wherein the predetermined operation is a parameter sharing start instruction from a user.

<Configuration 8>

The communication apparatus according to configuration 1, wherein the predetermined operation is a button selection operation performed by a user.

<Configuration 9>

The communication apparatus according to configuration 1, wherein the waiting unit waits to receive the authentication request at a predetermined communication channel.

<Configuration 10>

The communication apparatus according to configuration 1 further includes a notification unit configured to notify a user of an error in a case where the waiting unit receives neither the authentication request nor the signal compliant with the other standard during a predetermined period.

<Configuration 11>

The communication apparatus according to configuration 1, wherein, in a case where the waiting unit receives the authentication request compliant with the Wi-Fi Easy Connect® standard, the waiting unit stops waiting to receive the signal compliant with the other standard.

<Configuration 12>

The communication apparatus according to configuration 2, wherein the signal is a probe response frame compliant with the Wi-Fi Protected Setup® standard, and the waiting unit transmits a probe request frame upon receiving the predetermined operation.

<Configuration 13>

The communication apparatus according to configuration 2, wherein the signal is a probe response frame including information indicating that Wi-Fi Protected Setup® is enabled.

<Method 1>

A method for controlling a communication apparatus includes first processing configured to perform first sharing processing for sharing a communication parameter for connecting to a wireless network with another communication apparatus, according to a first method compliant with a Wi-Fi Easy Connect® standard, second processing configured to perform second sharing processing for sharing a communication parameter for connecting to a wireless network with the other communication apparatus, according to a second method compliant with another standard different from the Wi-Fi Easy Connect® standard, waiting to receive an authentication request compliant with the Wi-Fi Easy Connect® standard and waiting to receive a signal compliant with the other standard, upon receiving a predetermined operation, and performing control so that the first processing performs the first sharing processing in a case where the authentication request compliant with the Wi-Fi Easy Connect® standard is received and the second processing performs the second sharing processing in a case where the signal compliant with the other standard is received.

<Storage Medium 1>

A non-transitory computer-readable storage medium storing a program for causing a computer to perform method 1.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-161718, filed Oct. 6, 2022, which is hereby incorporated by reference herein in its entirety.

What is claimed is:

1. A communication apparatus comprising:

one or more memories storing instructions; and one or more processors coupled to the one or more memories, wherein execution of the instructions causes the one or more processors to function as:

a first processing unit configured to perform first sharing processing for sharing a communication parameter for connecting to a wireless network with another communication apparatus, according to a first method compliant with a Wi-Fi Easy Connect® standard;

a second processing unit configured to perform second sharing processing for sharing a communication parameter for connecting to a wireless network with the other communication apparatus, according to a second method compliant with a Wi-Fi Protected Setup® standard different from the Wi-Fi Easy Connect® standard;

a first control unit configured to perform control so that the communication apparatus displays a first screen including a Wi-Fi setup icon;

a detection unit configured to detect a user operation for selecting the Wi-Fi setup icon via the first screen;

a reception unit configured to receive a parameter sharing start instruction from a user, wherein the parameter sharing start instruction is issued in response to detection, by the detection unit, of the user operation selecting the Wi-Fi setup icon on the first screen;

a second control unit configured to perform control so that the communication apparatus displays a second screen including a first message indicating a condition in which both of a setting of the Wi-Fi Easy Connect® standard and a setting of the Wi-Fi Protected Setup® standard are able to be set and a second message indicating setup is currently in progress, upon receiving the parameter sharing start instruction;

a waiting unit configured to start waiting processing, wherein in the waiting processing, the waiting unit waits to receive an authentication request compliant with the Wi-Fi Easy Connect® standard and waits to receive a signal compliant with the Wi-Fi Protected Setup® standard, upon receiving the parameter sharing start instruction; and a third control unit configured to perform control so that the first processing unit performs the first sharing processing in a case where the authentication request compliant with the Wi-Fi Easy Connect® standard is received and the second processing unit performs the second sharing processing in a case where the signal compliant with the Wi-Fi Protected Setup® standard is received, wherein, in the communication apparatus, during a period from power-on of the communication apparatus until the parameter sharing start instruction is received, neither the first sharing processing nor the second sharing processing is executed due to the waiting processing not having been started.

2. The communication apparatus according to claim 1, wherein the second method compliant with the Wi-Fi Protected Setup® standard is a push button configuration (PBC) method compliant with the Wi-Fi Protected Setup® standard.

3. The communication apparatus according to claim 1, wherein the second method compliant with the Wi-Fi Protected Setup® standard is a personal identification number (PIN) method compliant with the Wi-Fi Protected Setup® standard.

4. The communication apparatus according to claim 1, wherein the waiting unit performs, in parallel, waiting to receive the authentication request and waiting to receive the signal.

5. The communication apparatus according to claim 1, wherein the waiting unit waits to receive the authentication request at a predetermined communication channel.

6. The communication apparatus according to claim 1, wherein execution of the instructions further causes the one or more processors to function as: a notification unit configured to notify a user of an error in a case where the waiting unit receives neither the authentication request compliant with the Wi-Fi Easy Connect® standard nor the signal compliant with the Wi-Fi Protected Setup® standard during a predetermined period.

7. The communication apparatus according to claim 1, wherein, in a case where the waiting unit receives the authentication request compliant with the Wi-Fi Easy Connect® standard, the waiting unit stops waiting to receive the signal compliant with the Wi-Fi Protected Setup® standard.

8. The communication apparatus according to claim 1, wherein the signal is a probe response frame compliant with the Wi-Fi Protected Setup® standard, and the waiting unit transmits a probe request frame upon receiving the parameter sharing start instruction.

9. The communication apparatus according to claim 1, wherein the signal is a probe response frame including information indicating that Wi-Fi Protected Setup® is enabled.

10. A method for controlling a communication apparatus, the method comprising:

performing a first sharing processing for sharing a communication parameter for connecting to a wireless network with another communication apparatus, according to a first method compliant with a Wi-Fi Easy Connect® standard;

performing a second sharing processing for sharing a communication parameter for connecting to a wireless network with the other communication apparatus, according to a second method compliant with a Wi-Fi Protected Setup® standard different from the Wi-Fi Easy Connect® standard;

performing control so that the communication apparatus displays a first screen including a Wi-Fi setup icon;

detecting a user operation for selecting the Wi-Fi setup icon via the first screen;

receiving a parameter sharing start instruction from a user, wherein the parameter sharing start instruction is issued in response to detecting the user operation selecting the Wi-Fi setup icon on the first screen;

performing control so that the communication apparatus displays a second screen including a first message indicating a condition in which both of a setting of the Wi-Fi Easy Connect® standard and a setting of the Wi-Fi Protected Setup® standard are able to be set and a second message indicating setup is currently in progress, upon receiving the parameter sharing start instruction;

starting waiting processing, wherein the waiting processing includes waiting to receive an authentication request compliant with the Wi-Fi Easy Connect® standard and waiting to receive a signal compliant with the Wi-Fi Protected Setup® standard, upon receiving the parameter sharing start instruction; and performing control so that the first sharing processing is performed in a case where the authentication request compliant with the Wi-Fi Easy Connect® standard is received and the second sharing processing is performed in a case where the signal compliant with the Wi-Fi Protected Setup® standard is received, wherein, in the communication apparatus, during a period from power-on of the communication apparatus until the parameter sharing start instruction is received, neither the first sharing processing nor the second sharing processing is executed due to the waiting processing not having been started.

11. The communication apparatus according to claim 1, wherein the second screen further includes a QR Code® including a public key to be used in the Wi-Fi Easy Connect® standard.

* * * * *